US006797413B2

(12) United States Patent
Takeishi et al.

(10) Patent No.: US 6,797,413 B2
(45) Date of Patent: Sep. 28, 2004

(54) COMPOSITE SUBSTRATE AND EL DEVICE USING THE SAME

(75) Inventors: Taku Takeishi, Chuo-ku (JP); Katsuto Nagano, Chuo-ku (JP); Suguru Takayama, Chuo-ku (JP); Yoshihiko Yano, Chuo-ku (JP)

(73) Assignee: TDK Corporation, Tokyo (JP)

( * ) Notice: Subject to any disclaimer, the term of this patent is extended or adjusted under 35 U.S.C. 154(b) by 177 days.

(21) Appl. No.: 09/971,707

(22) Filed: Oct. 9, 2001

(65) Prior Publication Data

US 2002/0037430 A1 Mar. 28, 2002

Related U.S. Application Data

(63) Continuation of application No. PCT/JP01/00813, filed on Feb. 6, 2001.

(30) Foreign Application Priority Data

| | | |
|---|---|---|
| Feb. 7, 2000 | (JP) | 2000-029465 |
| Mar. 3, 2000 | (JP) | 2000-059521 |
| Mar. 3, 2000 | (JP) | 2000-059522 |

(51) Int. Cl.[7] .......... B32B 19/00; B32B 9/00; H01J 63/04

(52) U.S. Cl. .......... 428/690; 428/917; 313/503; 313/506; 313/509

(58) Field of Search .......... 428/690, 917; 313/503, 506, 509

(56) References Cited

U.S. PATENT DOCUMENTS

| | | | | |
|---|---|---|---|---|
| 4,757,235 A | * 7/1988 | Nunomura et al. | 313/509 |
| 5,043,631 A | * 8/1991 | Kun et al. | 315/169.3 |
| 5,065,275 A | * 11/1991 | Fujisaki et al. | 361/321.4 |
| 5,107,174 A | * 4/1992 | Galluzzi et al. | 313/503 |
| 5,352,622 A | * 10/1994 | Chung | 437/52 |
| 6,340,537 B1 | * 1/2002 | Arai et al. | 428/690 |

FOREIGN PATENT DOCUMENTS

| | | |
|---|---|---|
| JP | 63-146398 | 6/1963 |
| JP | 61-230296 | 10/1986 |
| JP | 62-278791 | 12/1987 |
| JP | 62-278792 | 12/1987 |
| JP | 62-281295 | 12/1987 |
| JP | 63-69193 | 3/1988 |
| JP | 64-63297 | 3/1989 |
| JP | 5-9066 | 1/1993 |
| JP | 060084692 | * 3/1994 |
| JP | 7-50197 | 2/1995 |
| JP | 7-122365 | 5/1995 |
| JP | 9-63769 | 3/1997 |
| JP | 2000-260570 | 9/2000 |
| JP | 2000-294381 | 10/2000 |

OTHER PUBLICATIONS

U.S. patent application Ser. No. 09/971,707, Nagano et al., filed Oct. 9, 2001.
U.S. patent application Ser. No. 09/971,699, Nagano et al., filed Oct. 9, 2001.
U.S. patent application Ser. No. 09/970,803, Takeishi et al., filed Oct. 5, 2001.
U.S. patent application Ser. No. 09/866,697, Takeishi et al., filed May 30, 2001.

* cited by examiner

*Primary Examiner*—Cynthia H. Kelly
*Assistant Examiner*—Camie S Thompson
(74) *Attorney, Agent, or Firm*—Oblon, Spivak, McClelland, Maier & Neustadt, P.C.

(57) ABSTRACT

The invention aims to provide a composite substrate which suppresses reaction of a substrate with a dielectric layer that can otherwise cause degradation of the dielectric layer and which can be sintered at high temperature while minimizing the occurrence of cracks in the dielectric layer, and an EL device using the composite substrate. The object is attained by a composite substrate in which an electrode and a dielectric layer are successively formed on an electrically insulating substrate, the substrate having a coefficient of thermal expansion of 10–20 ppm/K, and an EL device using the composite substrate.

47 Claims, 1 Drawing Sheet

COMPOSITE SUBSTRATE AND EL DEVICE USING THE SAME

CROSS-REFERENCE TO RELATED APPLICATION

This application claims priority to International Application No. PCT/JP01/00813 filed Feb. 6, 2001 and Japanese Application Nos. 2000-029465 filed Feb. 7, 2000, 2000-059521 filed Mar. 3, 2000 and 2000-059522 filed Mar. 3, 2000, and the entire content of both applications is hereby incorporated by reference.

BACKGROUND OF THE INVENTION

1. Field of the Invention

This invention relates to a composite substrate having a dielectric and an electrode, and an electroluminescent (EL) device using the same.

2. Background Art

The phenomenon that a material emits light upon application of an electric field is known as electroluminescence (EL). Devices utilizing this phenomenon are on commercial use as backlight in liquid crystal displays (LCD) and watches.

The EL devices include dispersion type devices of the structure that a dispersion of a powder phosphor in an organic material or enamel is sandwiched between electrodes, and thin-film type devices in which a thin-film phosphor sandwiched between two electrodes and two insulating thin films is formed on an electrically insulating substrate. For each type, the drive modes include DC voltage drive mode and AC voltage drive mode. The dispersion type EL devices are known from the past and have the advantage of easy manufacture, but their use is limited because of a low luminance and a short lifetime. On the other hand, the thin-film type EL devices have markedly spread the practical range of EL device application by virtue of a high luminance and a long lifetime.

In prior art thin-film type EL devices, the predominant structure is such that blue sheet glass customarily used in liquid crystal displays and plasma display panels (PDP) is employed as the substrate, a transparent electrode of ITO or the like is used as the electrode in contact with the substrate, and the phosphor emits light which exits from the substrate side. Among phosphor materials, Mn-doped ZnS which emits yellowish orange light has been often used from the standpoints of ease of deposition and light emitting characteristics. The use of phosphor materials which emit light in the primaries of red, green and blue is essential to manufacture color displays. Engineers continued research on candidate phosphor materials such as Ce-doped SrS and Tm-doped ZnS for blue light emission, Sm-doped ZnS and Eu-doped CaS for red light emission, and Tb-doped ZnS and Ce-doped CaS for green light emission. However, problems of emission luminance, luminous efficiency and color purity remain outstanding until now, and none of these materials have reached the practical level.

High-temperature film deposition and high-temperature heat treatment following deposition are known to be promising as means for solving these problems. When such a process is employed, use of blue sheet glass as the substrate is unacceptable from the standpoint of heat resistance. Quartz substrates having heat resistance are under consideration, but they are not adequate in such applications requiring a large surface area as in displays because the quartz substrates are very expensive.

It was recently reported that a device was developed using an electrically insulating ceramic substrate as the substrate and a thick-film dielectric instead of a thin-film insulator under the phosphor, as disclosed in JP-A 7-50197 and JP-B 7-44072.

FIG. 2 illustrates the basic structure of this device. The EL device in FIG. 2 is structured such that a lower electrode 12, a thick-film dielectric layer 13, a light emitting layer 14, a thin-film insulating layer 15 and an upper electrode 16 are successively formed on a substrate 11 of ceramic or similar material. Since the light emitted by the phosphor exits from the upper side of the EL structure opposite to the substrate as opposed to the prior art structure, the upper electrode is a transparent electrode.

In this device, the thick-film dielectric has a thickness of several tens of microns which is about several hundred to several thousand times the thickness of the thin-film insulator. This offers advantages including a minimized chance of breakdown caused by pinholes or the like, high reliability, and high manufacturing yields.

Use of the thick dielectric invites a drop of the voltage applied to the phosphor layer, which is overcome by using a high-permittivity material as the dielectric layer. Use of the ceramic substrate and the thick-film dielectric permits a higher temperature for heat treatment. As a result, it becomes possible to deposit a light emitting material having good luminescent characteristics, which was impossible in the prior art because of the presence of crystal defects.

Preferred conditions for the dielectric material used as the thick-film dielectric include high permittivity, insulation resistance, and dielectric strength. When the substrate material is widespread crystallized glass or $Al_2O_3$ and the dielectric material is $BaTiO_3$ which is widely used as capacitor material because of good dielectric characteristics, there arises a problem that cracks develop in the $BaTiO_3$ dielectric layer upon firing. Since the dielectric layer has a reduced dielectric strength due to such cracks, an EL device fabricated using this composite substrate is likely to break down. The cause is presumably the difference in coefficient of thermal expansion between the substrate material and the dielectric, which has a significant influence since the dielectric must be fired at high temperatures. Because of this problem and the need to minimize the reaction of the dielectric material with the substrate material, lead-base dielectric materials having a relatively low firing temperature have been under predominant consideration as the dielectric material, as disclosed in JP-A 7-50197 and JP-B 7-44072.

However, the use of harmful lead in the raw material is undesirable from the manufacturing standpoint and because the cost of waste recovery is increased. Still worse, lead-base dielectric materials generally have a lower firing temperature than $BaTiO_3$, which prevents the heat treating temperature of a phosphor layer from being elevated, so that EL devices using them fail to provide satisfactory luminescent characteristics.

SUMMARY OF THE INVENTION

An object of the invention is to provide a composite substrate which suppresses reaction of a substrate with a dielectric layer that can otherwise cause degradation of the dielectric layer and which can be sintered at high temperature while minimizing the generation of cracks in the dielectric layer, as well as an EL device using the same.

The above object is attained by the following construction.

(1) A composite substrate in which an electrode and a dielectric layer are successively formed on an electrically insulating substrate, said substrate having a coefficient of thermal expansion of 10 to 20 ppm/K.

(2) The composite substrate of (1) wherein said substrate is composed mainly of magnesia (MgO), steatite ($MgO.SiO_2$) or forsterite ($2MgO.SiO_2$).

(3) The composite substrate of (1) or (2) wherein said dielectric layer is a sintered ceramic body composed mainly of barium titanate ($BaTiO_3$).

(4) The composite substrate of (3) wherein said dielectric layer contains one or more oxides selected from the group consisting of manganese oxide (MnO), magnesium oxide (MgO), tungsten oxide ($WO_3$), calcium oxide (CaO), zirconium oxide ($ZrO_2$), niobium oxide ($Nb_2O_5$) and cobalt oxide ($Co_2O_3$).

(5) The composite substrate of (3) or (4) wherein said dielectric layer contains the oxides of one or more elements selected from the group consisting of rare earth elements Sc, Y, La, Ce, Pr, Nd, Pm, Sm, Eu, Gd, Tb, Dy, Ho, Er, Tm, Yb and Lu.

(6) The composite substrate of any one of (3) to (5) wherein said dielectric layer contains a vitreous component composed of silicon oxide ($SiO_2$).

(7) An EL device comprising at least a light emitting layer and a second electrode on the composite substrate of any one of (1) to (6).

(8) The EL device of (7) further comprising a second insulator layer between the light emitting layer and the second electrode.

FUNCTION

Since the specific substrate material and the dielectric material of the specific composition are used according to the invention, there is fabricated a composite substrate which can be sintered at a high temperature without incurring reaction of the dielectric layer with the substrate that can otherwise cause degradation of the dielectric layer and which has a thick-film dielectric layer free of cracks.

When an EL device is fabricated using the composite substrate having such a high firing temperature, the heat treating temperature of a phosphor layer can be increased whereby crystal defects in the phosphor layer are reduced and improved luminescent characteristics are obtainable. This function is effective especially when a Ce-doped SrS phosphor layer capable of emitting blue light is deposited. The dielectric layer has a high dielectric strength due to the absence of cracks, allowing high voltage drive ensuring improved luminescent characteristics.

BEST MODE FOR CARRYING OUT THE INVENTION

The composite substrate of the invention has the construction that an electrode and a dielectric layer are successively formed on an electrically insulating substrate. The substrate has a coefficient of thermal expansion of 10 to 20 ppm/K and is preferably composed mainly of magnesia (MgO), steatite ($MgO.SiO_2$) or forsterite ($2MgO.SiO_2$).

Also preferably, the dielectric layer is a sintered ceramic body composed mainly of barium titanate ($BaTiO_3$). The dielectric layer may further contain one or more oxides selected from among rare earth oxides, MnO, MgO, $WO_3$, $SiO_2$, CaO, $ZrO_2$, $Nb_2O_5$ and $Co_2O_3$.

Figure 1:
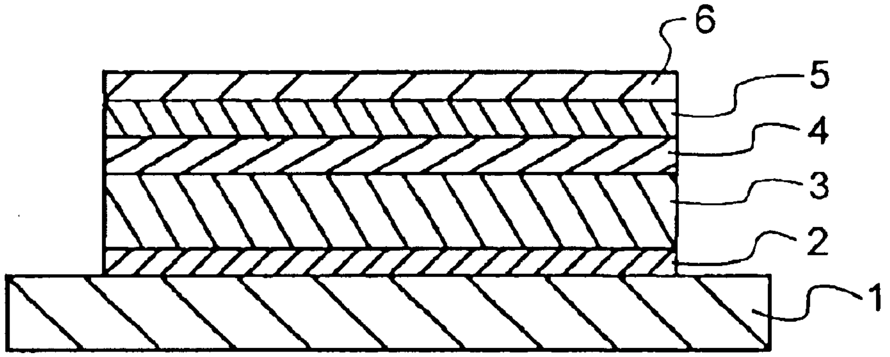
FIG. 1 is a schematic cross-sectional view showing the construction of an exemplary EL device according to the invention.
Figure 2:
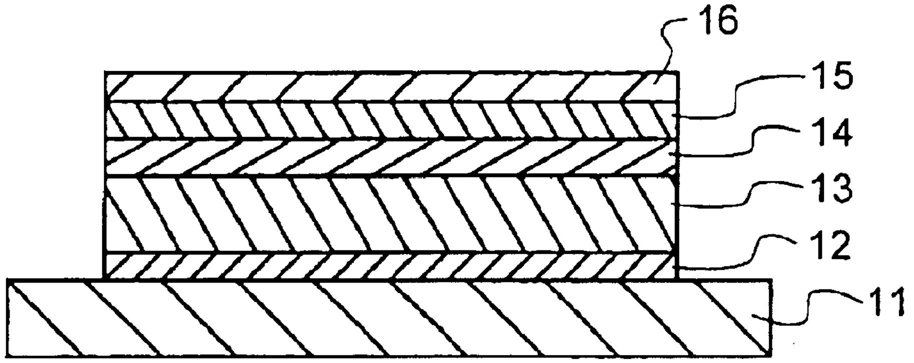
FIG. 2 is a schematic cross-sectional view showing the construction of a prior art EL device.

FIG. 1 is a cross-sectional view of an electroluminescent (EL) device using a composite substrate according to the invention. The composite substrate is a ceramic laminate structure having a substrate 1 of the above-described composition, a thick-film electrode (or first electrode) 2 formed thereon in a predetermined pattern, and a dielectric layer (or first dielectric layer) 3 of sintered high-permittivity ceramic body formed thereon by a thick-film technique.

The EL device using the composite substrate has a basic structure as shown in FIG. 1, for example, including a thin-film light emitting layer (or phosphor layer) 4, a thin-film insulating layer (or second insulating layer) 5, and a transparent electrode (or second electrode) 6, which are formed on the dielectric layer of the composite substrate by such a technique as vacuum evaporation, sputtering or CVD. A single insulating structure with the thin-film insulating layer omitted is also acceptable.

The composite substrate and the EL device using the same according to the invention are characterized by the use as the substrate material of magnesia (MgO), steatite ($MgO.SiO_2$) or forsterite ($2MgO.SiO_2$) which does not react with $BaTiO_3$ of the dielectric layer up to high temperature and has a substantially equal coefficient of thermal expansion to that of $BaTiO_3$. Since the dielectric layer does not react with the substrate up to high temperature, the EL device fabricated using the composite substrate of the invention allows the light emitting layer (phosphor layer) to be heat treated at a higher temperature, leading to improved luminescent characteristics. Also, since the substrate and the dielectric layer have a substantially equal coefficient of thermal expansion, no cracks form in the dielectric layer, which has a higher dielectric strength. Then the EL device fabricated using the composite substrate allows high voltage drive ensuring improved luminescent characteristics.

The substrate material used is composed mainly of magnesia (MgO), steatite ($MgO.SiO_2$) or forsterite ($2MgO.SiO_2$). Any of these materials may be used although a substrate material having a substantially equal coefficient of thermal expansion to that of the dielectric material is preferable. Among others, magnesia is preferred.

The substrate formed of such material preferably has a coefficient of thermal expansion of 10 to 20 ppm/K, and especially about 12 to 18 ppm/K.

The lower electrode layer serving as the first electrode is formed at least on the insulated substrate side or within the insulating layer. The electrode layer which is exposed to high temperature during formation of the insulating layer or during heat treatment together with the light emitting layer may be a commonly used metallic electrode composed mainly of palladium, rhodium, iridium, rhenium, ruthenium, platinum, silver, gold, tantalum, nickel, chromium or titanium.

When Pd, Pt, Au, Ag or an alloy thereof is used, firing in air is possible. When $BaTiO_3$ which has been tailored to be resistant to chemical reduction is used so that firing in a reducing atmosphere is possible, a base metal such as Ni may be used as the internal electrode.

The upper electrode layer serving as the second electrode may be a transparent electrode which is transmissive to light in the predetermined emission wavelength region. In this embodiment, it is especially preferred to use a transparent electrode of ZnO or ITO. ITO generally contains $In_2O_3$ and SnO in the stoichiometric composition although the O content may somewhat deviate therefrom. The mixing proportion of $SnO_2$ to $In_2O_3$ is preferably 1 to 20% by weight, and more preferably 5 to 12% by weight. For IZO, the mixing proportion of ZnO to $In_2O_3$ is about 12 to 32% by weight.

Also the electrode layer may be a silicon-based one. The silicon electrode layer may be either polycrystalline silicon (p-Si) or amorphous silicon (a-Si), or even single crystal silicon if desired.

In addition to silicon as the main component, the electrode layer is doped with an impurity for imparting electric conductivity. Any dopant may be used as the impurity as long as it can impart the desired conductivity. Use may be made of dopants commonly used in the silicon semiconductor art. Exemplary dopants are B, P, As, Sb, Al and the like. Of these, B, P, As, Sb and Al are especially preferred. The preferred dopant concentration is about 0.001 to 5 at %.

In forming the electrode layer from these materials, any of conventional methods such as evaporation, sputtering, CVD, sol-gel and printing/firing methods may be used. Particularly when a structure in which a thick film having an electrode built therein is formed on a substrate is fabricated, the same method as used for the dielectric thick film is preferred.

The electrode layer should preferably have a resistivity of up to 1 Ω·cm, especially about 0.003 to 0.1 Ω·cm in order to apply an effective electric field across the light emitting layer. The preferred thickness of the electrode layer is about 50 to 10,000 nm, more preferably about 100 to 5,000 nm, especially about 100 to 3,000 nm, though it depends on the identity of electrode material.

The dielectric thick-film materials used as the first insulating layer include well-known dielectric thick-film materials. Those materials having a relatively high permittivity, dielectric strength and insulation resistance are preferred.

For example, such materials as lead titanate, lead niobate and barium titanate base materials may be used as the main component. Barium titanate ($BaTiO_3$) is especially preferred in relation to the substrate.

The dielectric layer may further contain as an auxiliary component one or more oxides selected from among manganese oxide (MnO), magnesium oxide (MgO), tungsten oxide ($WO_3$), calcium oxide (CaO), zirconium oxide ($ZrO_2$), niobium oxide ($Nb_2O_5$) and cobalt oxide ($Co_2O_3$) or the oxide or oxides of one or more elements selected from among rare earth elements Sc, Y, La, Ce, Pr, Nd, Pm, Sm, Eu, Gd, Tb, Dy, Ho, Er, Tm, Yb and Lu. The auxiliary component is preferably contained in an amount of up to 50 mol %, more preferably 0.004 to 40 mol %, and even more preferably 0.01 to 30 mol % based on the main component, especially $BaTiO_3$.

Also, the dielectric layer may further contain a vitreous component of silicon oxide ($SiO_2$), preferably in an amount of up to 2% by weight, especially 0.05 to 0.5% by weight. The inclusion of the vitreous component leads to an improvement in sinterability.

Moreover, any one or a mixture of two or more of the following materials may be used.

(A) Perovskite type materials: lead family perovskite compounds such as $PbTiO_3$, rare earth-containing lead titanate, PZT (lead zircon titanate) and PLZT (lead lanthanum zircon titanate); $NaNbO_3$, $KNbO_3$, $NaTaO_3$, $KTaO_3$, $CaTiO_3$, $SrTiO_3$, $BaTiO_3$, $BaZrO_3$, $CaZrO_3$, $SrZrO_3$, $CdZrO_3$, $CdHfO_3$, $SrSnO_3$, $LaAlO_3$, $BiFeO_3$, and bismuth family perovskite compounds. Included are simple perovskite compounds as above, complex perovskite compounds containing three or more metal elements, perovskite-type complex and layer compounds.

(B) Tungsten bronze type materials: tungsten bronze type oxides such as lead niobate, SBN (strontium barium niobate), PBN (lead barium niobate), $PbNb_2O_6$, $PbTa_2O_6$, $PbNb_4O_{11}$, $Ba_2KNb_5O_{15}$, $Ba_2LiNb_5O_{15}$, $Ba_2AgNb_5O_{15}$, $Ba_2Rb\ Nb_5O_{15}$, $SrNb_2O_6$, $Sr_2NaNb_5O_{15}$, $Sr_2LiNb_5O_{15}$, $Sr_2KNb_5O_{15}$, $Sr_2Rb\ Nb_5O_{15}$, $Ba_3Nb_{10}O_{28}$, $Bi_3Nd_{17}O_{47}$, $K_3Li_2Nb_5O_{15}$, $K_2RNb_5O_{15}$ (wherein R is Y, La, Ce, Pr, Nd, Sm, Eu, Gd, Tb, Dy or Ho), $K_2BiNb_5O_{15}$, $Sr_2TlNb_5O_{15}$, $Ba_2NaNb_5O_{15}$, and $Ba_2KNb_5O_{15}$.

(C) $YMnO_3$ type materials: oxides containing a rare earth element (inclusive of Sc and Y), Mn and O and having a hexagonal $YMnO_3$ structure. Exemplary are $YMnO_3$ and $HoMnO_3$.

Most of these materials are ferroelectric. These materials are described in further detail.

Of (A) perovskite type materials, $BaTiO_3$ and Sr family perovskite compounds are generally represented by the chemical formula $ABO_3$ wherein A and B each are a cation. Preferably, A is at least one element selected from among Ca, Ba, Sr, Pb, K, Na, Li, La and Cd, and B is at least one element selected from among Ti, Zr, Ta and Nb.

The ratio A/B in such perovskite type compounds is preferably between 0.8 and 1.3, and more preferably between 0.9 and 1.2.

Ratios of A/B in the above range ensure the insulation of dielectrics and improve the crystallinity thereof, improving the dielectric or ferroelectric characteristics thereof. By contrast, at A/B ratios below 0.8, the crystallinity improving effect is not expectable. At A/B ratios beyond 1.3, it is difficult to form homogeneous thin films.

The desired A/B is accomplished by controlling film depositing conditions. The proportion of O in $ABO_3$ is not limited to 3. Some perovskite materials form a stable perovskite structure when they are in short or excess of oxygen. In $ABO_x$, the value of x is generally from about 2.7 to about 3.3. It is understood that the A/B ratio can be determined by x-ray fluorescence analysis.

The $ABO_3$ type perovskite compound used herein may be any of $A^{1+}B^{5+}O_3$, $A^{2+}B^{4+}O_3$, $A^{3+}B^{3+}O_3$, $A_xBO_3$, $A(B'_{0.67}B''_{0.33})$ $A(B'_{0.33}B''_{0.67})O_3$, $A(B^{+3}{}_{0.5}B^{+5}{}_{0.5})O_3$, $A(B^{2+}{}_{0.5}B^{6+}{}_{0.5})O_3$, $A(B^{1+}{}_{0.5}B^{7+}{}_{0.5})O_3$, $A^{3+}(B^{2+}{}_{0.5}B^{4+}{}_{0.5})O_3$, $A(B^{1+}{}_{0.25}B^{5+}{}_{0.75})O_3$, $A(B^{3+}{}_{0.5})O_{2.75}$, and $A(B^{2+}{}_{0.5}B^{5+}{}_{0.5})O_{2.75}$.

More illustrative are lead family perovskite compounds such as PZT and PLZT, $NaNbO_3$, $KNbO_3$, $NaTaO_3$, $KTaO_3$, $CaTiO_3$, $SrTiO_3$, $BaTiO_3$, $BaZrO_3$, $CaZrO_3$, $SrZrO_3$, $CdHfO_3$, $CdZrO_3$, $SrSnO_3$, $LaAlO_3$, $BiFeO_3$, bismuth family perovskite compounds, and solid solutions thereof.

It is to be noted that PZT is a solid solution of $PbZrO_3$—$PbTiO_3$ system. PLZT is a compound of PZT doped with La and has the formula: $(Pb_{0.89\text{-}0.91}La_{0.11\text{-}0.09})(Zr_{0.65}Ti_{0.35})O_3$ when represented according to the $ABO_3$.

Of the layer perovskite compounds, bismuth family layer compounds are generally represented by the formula:

$$Bi_2A_{m-1}B_mO_{3m+3}$$

wherein m is an integer of 1 to 5, A is selected from among Bi, Ca, Sr, Ba, Pb, Na, K and rare earth elements (inclusive of Sc and Y), and B is Ti, Ta or Nb. Illustrative are $Bi_4Ti_3O_{12}$, $SrBi_2Ta_2O_9$, and $SrBi_2Nb_2O_9$. Any of these compounds or a solid solution thereof may be used in the practice of the invention.

The preferred perovskite type compounds used herein are those having a high permittivity, for example, $NaNbO_3$, $KNbO_3$, $KTaO_3$, $CdHfO_3$, $CdZrO_3$, $BiFeO_3$ and bismuth family perovskite compounds, with $CdHfO_3$ being more preferred.

(B) The tungsten bronze type materials are preferably those tungsten bronze type materials described in the collection of ferroelectric materials by Landoit-Borenstein, Vol. 16. The tungsten bronze type materials generally have the chemical formula: $A_yB_5O_{15}$ wherein A and B each are a cation. Preferably, A is one or more elements of Mg, Ca, Ba, Sr, Pb, K, Na, Li, Rb, Tl, Bi, rare earth elements and Cd, and B is one or more elements selected from Ti, Zr, Ta, Nb, Mo, W, Fe and Ni.

The ratio O/B in these tungsten bronze type materials is not limited to 15/5. Some tungsten bronze type materials form a stable tungsten bronze structure when they are in short or excess of oxygen. The ratio O/B is generally between about 2.6 and about 3.4.

Illustrative examples include tungsten bronze type oxides, such as $(Ba,Pb)Nb_2O_6$, $PbNb_2O_6$, $PbTa_2O_6$, $PbNb_4O_{11}$, $PbNb_2O_6$, SBN (strontium barium niobate), $Ba_2KNb_5O_{15}$, $Ba_2LiNb_5O_{15}$, $Ba_2AgNb_5O_{15}$, $Ba_2RbNb_5O_{15}$, $SrNb_2O_6$, $BaNb_2O_6$, $Sr_2NaNb_5O_{15}$, $Sr_2LiNb_5O_{15}$, $Sr_2KNb_5O_{15}$, $Sr_2RbNb_5O_{15}$, $Ba_3Nb_{10}O_{28}$, $Bi_3Nd_{17}O_{47}$, $K_3Li_2Nb_5O_{15}$, $K_2RNb_5O_{15}$ (wherein R is Y, La, Ce, Pr, Nd, Sm, Eu, Gd, Tb, Dy or Ho), $K_2BiNb_5O_{15}$, $Sr_2TlNb_5O_{15}$, $Ba_2NaNb_5O_{15}$, and $Ba_2KNb_5O_{15}$, and solid solutions thereof. Preferred among others are SBN ($(Ba,Sr)Nb_2O_6$), $Ba_2KNb_5O_{15}$, $Ba_2LiNb_5O_{15}$, $Ba_2AgNb_5O_{15}$, $Sr_2NaNb_5O_{15}$, $Sr_2LiNb_5O_{15}$, and $Sr_2KNb_5O_{15}$.

(C) The $YMnO_3$ type materials have the chemical formula: $RMnO_3$ wherein R is preferably at least one rare earth element (inclusive of Sc and Y). The ratio R/Mn in the $YMnO_3$ type materials is preferably between 0.8 and 1.2, and more preferably between 0.9 and 1.1. Ratios of R/Mn in this range ensure the insulation of dielectrics and improve the crystallinity thereof, improving the ferroelectric characteristics thereof. By contrast, R/Mn ratios below 0.8 or above 1.2 tend to lower crystallinity. Especially at R/Mn ratios beyond 1.2, materials are likely to be paraelectric rather than ferroelectric and sometimes cannot be applied to devices utilizing polarization. The desired R/Mn is accomplished by controlling film depositing conditions. It is understood that the R/Mn ratio can be determined by x-ray fluorescence analysis.

The preferred $YMnO_3$ type materials used herein have a hexagonal crystal structure. The existing $YMnO_3$ type materials include those having a hexagonal crystal structure and those having a rhombic crystal structure. To achieve the phase transition effect, hexagonal crystal materials are preferred. Illustrative are materials having a substantial composition of $YMnO_3$, $HoMnO_3$, $ErMnO_3$, $YbMnO_3$, $TmMnO_3$ or $LuMnO_3$, or solid solutions thereof.

The dielectric layer thick-film preferably has a resistivity of at least about $10^8$ Ω·cm, especially about $10^{10}$ to $10^{18}$ Ω·cm. A material having a relatively high permittivity as well is preferred. The permittivity $\epsilon$ is preferably about 100 to 10,000. The film thickness is preferably 5 to 50 μm, and more preferably 10 to 30 μm.

Any desired method may be used in forming the dielectric layer thick-film. A method capable of easily forming a film of 10 to 50 μm thick is recommended, with the sol-gel and printing/firing methods being preferred.

When the printing/firing method is used, a material having a properly selected particle size is mixed with a binder to form a paste having an appropriate viscosity. The paste is applied onto a substrate by a screen printing technique and dried. The green sheet is fired at a suitable temperature, yielding a thick film.

If the thick film thus obtained has asperities or holes as large as 1 μm or more, it is preferred in some embodiments to improve the surface flatness or smoothness by polishing the film or forming a smoothing layer thereon.

In the inorganic electroluminescent (EL) device, the materials used in its light emitting layer includes ZnS and Mn/CdSSe as the red light emitting material, ZnS:TbOF and ZnS:Tb as the green light emitting material, and SrS:Ce, (SrS:Ce/ZnS)n, $CaGa_2S_4$:Ce, and $SrGa_2S_4$:Ce as the blue light emitting material. Multilayer films of SrS:Ce/ZnS:Mn and the like are known as the material capable of emitting white light.

In the practice of the invention, the materials used in the fluorescent thin film of the EL device preferably include Group II-sulfur compounds, Group II-Group III-sulfur compounds and rare earth sulfides, and more illustratively, II-S compounds as typified by SrS, $II-III_2-S_4$ compounds (wherein II=Zn, Cd, Ca, Mg, Be, Sr, Ba or rare earth and III=B, Al, Ga, In or Tl) as typified by $SrGa_2S_4$, and rare earth sulfides such as $Y_2S_3$, and mixed crystals or mixed compounds obtained by combining plural components using these compounds.

The compositional ratio of these compounds does not strictly take the above-described value, but has a certain solid solution limit with respect to each element. Therefore, a compositional ratio within that range is acceptable.

In general, the EL phosphor thin-film is formed of a matrix material to which a luminescence center is added. Any luminescence center selected from well-known transition metals and rare earth elements may be added in a conventional quantity. For example, a rare earth element such as Ce or Eu or Cr, Fe, Co, Ni, Cu, Bi, Ag or the like in metallic or sulfide form is added to a raw material. Since the addition quantity varies with the raw material and the thin film to be formed, the composition of the raw material is adjusted so that the thin film may have an ordinary addition quantity.

Any of well-known techniques such as evaporation, sputtering, CVD, sol-gel and printing/firing techniques may be used in forming an EL phosphor thin-film from these materials.

The thickness of the light emitting layer is not critical. Too large a thickness causes to increase the drive voltage whereas too small a thickness leads to a decline of emission efficiency. Illustratively, the thickness is preferably about 100 to 1,000 nm, and especially about 150 to 700 nm, though it depends on the identity of phosphor material.

To obtain a sulfide phosphor thin-film having a high luminance, a sulfide phosphor of the desired composition is preferably formed at a high temperature in excess of 600° C. or annealed at a high temperature in excess of 600° C., if desired. In particular, to obtain a blue phosphor having a high luminance, a high-temperature process is effective. The dielectric thick-film for inorganic EL devices according to the invention can withstand such high-temperature process.

The inorganic EL device preferably includes a thin-film insulating layer (or second insulating layer) between the electrode layer and the phosphor thin-film (or light emitting layer). The materials of which the thin-film insulating layer is made include silicon oxide ($SiO_2$), silicon nitride ($Si_3N_4$), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate, PMN-PT base materials and multilayer or mixed thin-films thereof. Any of well-known techniques such as evaporation, sputtering, CVD, sol-gel and printing/firing techniques may be used in forming the insulating layer from these materials. The insulating layer thus formed preferably has a thickness of about 50 to 1,000 nm, and especially about 100 to 500 nm.

Once the thin-film insulating layer is formed, another thin-film insulating layer may be formed in a duplex configuration using another material, if desired.

Further, an electrode layer (or second electrode) is preferably formed on the thin-film insulating layer. The material of the electrode layer is preferably selected from the electrode materials described above.

Using the composite substrate of the invention, an EL device can be constructed in this way. Since the phosphor thin-film can be formed by the high-temperature process, the performance of a blue phosphor which is short of luminance in the prior art can be significantly improved, and hence, a full-color EL display can be implemented. Further, since an insulating thick-film having a high density and free of cracks can be formed according to the invention, the EL device is less prone to breakdown and outstandingly increased in stability as compared with conventional thin-film dual insulating structure, achieving a higher luminance and a lower voltage.

The composite substrate is preferably prepared by a conventional thick-film laminating technique. Specifically, onto a substrate of magnesia (MgO), steatite ($MgO.SiO_2$) or forsterite ($2MgO.SiO_2$), a paste using a conductive powder such as Pd or Pt as a source is printed in a pattern by a screen printing technique or the like. Further, a thick film is formed thereon using a dielectric paste prepared employing a powdery dielectric material as a source. Alternatively, the dielectric paste is cast to form a green sheet, which is placed and press bonded onto the electrode. It is also possible to print an electrode on a green sheet of dielectric, which is press bonded to a stress relief layer on the substrate.

In a further alternative, a green laminate sheet consisting of a stress relief layer, electrode and dielectric is separately formed and press bonded to the substrate. The stress relief layer having a graded composition can be formed by successively stacking layers of varying composition.

The structure thus constructed is fired at a temperature of 1,000° C. to less than 1,600° C., preferably 1,200° C. to 1,500° C., and more preferably 1,300° C. to 1,450° C.

EXAMPLE

Examples are given below for illustrating the composite substrate and EL device according to the invention.

Example 1

On a substrate shown in Table 1, a paste based on Pd powder was printed in a stripe pattern having a width of 1.6 mm and a gap of 1.5 mm as an electrode and dried for several minutes at 1,100° C.

Separately, MnO, MgO, $Y_2O_3$, $V_2O_5$ or $(Ba,Ca)SiO_3$ was added to $BaTiO_3$ powder in a predetermined concentration and mixed in water. The mixed powder was dried and admixed with a binder to form a dielectric paste. The dielectric paste thus obtained was printed onto the electrode pattern-printed substrate to a thickness of 30 μm, dried, and fired in air at 1,200° C. for 2 hours. The dielectric layer as fired was 10 μm thick.

To measure the electric characteristics of the dielectric layer, a sample was separately prepared by printing a stripe pattern of Pd electrode having a width of 1.5 mm and a gap of 1.5 mm so as to extend perpendicular to the underlying electrode pattern after drying of the dielectric paste, drying and firing in the above-mentioned temperature profile. An EL device was constructed by sputtering a Mn-doped ZnS target, with the composite substrate heated at 250° C., to form a ZnS phosphor thin film of 0.7 μm thick, followed by heat treatment in vacuum for 10 minutes. Then a $Si_3N_4$ thin film as the second insulating layer and an ITO thin film as the second electrode were successively formed by sputtering, completing the EL device.

The luminescent characteristics of the EL device were determined by extending electrodes from the printed/fired electrode and the ITO transparent electrode of the cell structure obtained above and applying an electric field at a frequency of 1 kHz and a pulse width of 50 μs.

Table 1 shows the electrical characteristics of the dielectric layers of the composite substrates prepared as above and the luminescent characteristics of the EL devices fabricated using the composite substrates.

TABLE 1

| No. | Substrate material | Dielectric layer | | Firing temperature (° C.) | Dielectric layer thickness (μm) | Relative permittivity | tanδ (%) | Dielectric strength (V/μm) | Heat treating temperature of phosphor layer (° C.) | Emission start voltage (V) | Emission luminance at 210 V (cd/m²) |
|---|---|---|---|---|---|---|---|---|---|---|---|
| 1 | MgO | $BaTiO_3$ thick film | $Li_2SiO_3$ 5 mol % | 1200 | 17 | 2060 | 2.2 | 19 | 600 | 120 | 1500 |
| 2 | MgO | $BaTiO_3$ thick film | — | 1270 | 13 | 1660 | 2.6 | 20 | 600 | 135 | 1300 |
| 3 | MgO | $BaTiO_3$ thick film | — | 1340 | 12 | 2300 | 0.8 | 40 | 600 | 138 | 1250 |
| 4 | MgO | $BaTiO_3$ thick film | — | 1410 | 11 | 7510 | 0.8 | 9 | 600 | 140 | 1250 |
| 5 | MgO | $BaTiO_3$ thick film | — | 1340 | 12 | 2300 | 0.8 | 40 | 800 | 98 | 1270 |
| 6 | MgO | $BaTiO_3$ thick film | — | 1340 | 12 | 2300 | 0.8 | 40 | 900 | 99 | 1250 |
| 7 | MgO | $BaTiO_3$ thick film | — | 1340 | 12 | 2300 | 0.8 | 40 | 1000 | 95 | 1200 |
| 8 | MgO—$SiO_2$ | $BaTiO_3$ thick film | — | 1340 | 12 | 1650 | 1.2 | 35 | 600 | 130 | 1020 |
| 9 | 2MgO—$SiO_2$ | $BaTiO_3$ thick film | — | 1340 | 12 | 1570 | 1.7 | 30 | 600 | 130 | 1000 |
| Com. 1 | blue sheet glass | $Y_2O_3$ thin film | — | — | 0.6 | 12 | 1.1 | 370 | — | 186 | 150 |
| Com. 2 | blue sheet glass | $Si_3N_4$ thin film | — | — | 0.6 | 8 | 1.0 | 720 | — | 192 | 60 |

Com.: Comparative example

As is evident from Table 1, the inventive samples in which the coefficient of thermal expansion of substrates is adjusted optimum to permit use of a thick film of high permittivity material have a low emission start voltage as compared with prior art devices, and provide a higher emission luminance when the same voltage is applied. Elevating the heat treating temperature is effective for further reducing the emission start voltage.

BENEFITS OF THE INVENTION

According to the invention, there are provided a composite substrate which suppresses reaction of a substrate with a dielectric layer that can otherwise cause degradation of the dielectric layer and which can be sintered at high temperature while minimizing the occurrence of cracks in the dielectric layer, and an EL device using the composite substrate.

What is claimed is:

1. A composite substrate in which an electrode and a dielectric layer are successively formed on an electrically insulating substrate, said substrate having a coefficient of thermal expansion of 10 to 20 ppm/K, wherein said dielectric layer is a sintered ceramic body composed mainly of barium titanate ($BaTiO_3$), and wherein said dielectric layer contains one or more oxides selected from the group consisting of manganese oxide (MnO), magnesium oxide (MgO), tungsten oxide ($WO_3$), calcium oxide (CaO), zirconium oxide (ZrOz), niobium oxide ($Nb_2O_5$) and cobalt oxide ($Co_2O_3$).

2. The composite substrate of claim 1, wherein said substrate is composed mainly of magnesia (MgO), steatite ($MgO.SiO_2$) or forsterite ($2MgO.SiO_2$).

3. The composite substrate of claim 1, wherein said dielectric layer contains a vitreous component composed of silicon oxide ($SiO_2$).

4. The composite substrate of claim 1, wherein said substrate has a coefficient of thermal expansion of about 12 to 18 ppm/K.

5. The composite substrate of claim 1, wherein the electrode comprises a metallic electrode selected from the group consisting of palladium, rhodium, iridium, rhenium, ruthenium, platinum, silver, gold, tantalum, nickel, chromium and titanium.

6. The composite substrate of claim 1, wherein the electrode comprises a metallic electrode selected from the group consisting of Pd, Pt, Au, Ag and an alloy thereof.

7. The composite substrate of claim 1, wherein said one or more oxides are present in an amount of up to 50 mol %, based on barium titanate ($BaTiO_3$).

8. The composite substrate of claim 1, wherein said one or more oxides are present in an amount of 0.004 to 40 mol %, based on barium titanate ($BaTiO_3$).

9. The composite substrate of claim 1, wherein said one or more oxides are present in an amount of 0.01 to 30 mol %, based on barium titanate ($BaTiO_3$).

10. The composite substrate of claim 2, wherein said substrate is composed mainly of magnesia.

11. An EL device comprising at least a light emitting layer and a second electrode on the composite substrate of claim 1.

12. The EL device of claim 11, further comprising a second insulator layer between the light emitting layer and the second electrode.

13. The EL device of claim 11, wherein the second electrode is a transparent electrode of ITO or IZO.

14. The EL device of claim 13, wherein said ITO comprises a proportion of $SnO_2$ to $In_2O_3$ of from 12 to 20% by weight.

15. The EL device of claim 13, wherein said IZO comprises a proportion of ZnO to $In_2O_3$, of about 12 to 32% by weight.

16. The EL device of claim 13, wherein the second electrode is silicon-based.

17. The EL device of claim 16, wherein the silicon-based electrode is selected from the group consisting of polycrystalline silicon (p-Si), amorphous-silicon (a-Si) and single crystal silicon.

18. The EL device of claim 16, wherein said silicon-based electrode comprises a dopant to impart conductivity.

19. The EL device of claim 18, wherein said dopant is selected from the group consisting of B, P, As, Sb and Al in an amount of about 0.001 to 5 at. %.

20. The EL device of claim 13, wherein said second electrode has a resistivity of up to 1 Ωcm.

21. The EL device of claim 20, wherein said second electrode has a resistivity of from about 0.003 to 0.1 Ω·cm.

22. The EL device of claim 11, wherein said light emitting layer comprises a phosphor.

23. The EL device of claim 22, wherein said phosphor is a sulfide phosphor.

24. The EL device of claim 23, wherein said sulfide phosphor is a ZnS phosphor.

25. A composite substrate in which an electrode and a dielectric layer are successively formed on an electrically insulating substrate, said substrate having a coefficient of thermal expansion of 10 to 20 ppm/K, wherein said dielectric layer is a sintered ceramic body composed mainly of barium titanate ($BaTiO_3$), and wherein said dielectric layer contains the oxides of one or more elements selected from the group consisting of rare earth elements Sc, Y, La, Ce, Pr, Nd, Pm, Sm, Eu, Gd, Tb, Dy, Ho, Er, Tm, Yb and Lu.

26. The composite substrate of claim 25, wherein said substrate has a coefficient of thermal expansion of about 12 to 18 ppm/K.

27. The composite substrate of claim 25, wherein the electrode comprises a metallic electrode selected from the group consisting of palladium, rhodium, iridium, rhenium, ruthenium, platinum, silver, gold, tantalum, nickel, chromium and titanium.

28. The composite substrate of claim 25, wherein the electrode comprises a metallic electrode selected from the group consisting of Pd, Pt, Au, Ag and an alloy thereof.

29. The composite substrate of claim 25, wherein said oxides of one or more elements are present in an amount of up to 50 mol %, based on barium titanate ($BaTiO_3$).

30. The composite of claim 25, wherein said oxides of one or more elements are present in an amount of 0.004 to 40 mol %, based on barium titanate ($BaTiO_3$).

31. The composite substrate of claim 25, where said oxides of one or more elements are present in an amount of 0.01 to 30 mol %, based on barium titanate ($BaTiO_3$).

32. The composite substrate of claim 25, wherein said substrate is composed mainly of magnesia (MgO), steatite ($MgO.SiO_2$) or forsterite ($2MgO.SiO_2$).

33. The composite substrate of claim 25, wherein said substrate is composed mainly of magnesia.

34. An EL device comprising at least a light emitting layer and a second electrode on the composite substrate of claim 25.

35. The EL device of claim 34 further comprising a second insulator layer between the light emitting layer and the second electrode.

36. The EL device of claim 34, wherein the second electrode is a transparent electrode of ITO or IZO.

37. The EL device of claim 36, wherein said ITO comprises a proportion of $SnO_2$ to $In_2O_3$ of from 1 to 20% by weight.

38. The EL device of claim 36, wherein said IZO comprises a proportion of ZnO to $In_2O_3$ of about 12 to 32% by weight.

39. The EL device of claim 36, wherein the second electrode is silicon-based.

40. The EL device of claim 36, wherein said second electrode has a resistivity of up to 1 Ω·cm.

41. The EL device of claim 40, wherein said second electrode has a resistivity of from about 0.003 to 0.1 Ω·cm.

42. The EL device of claim 39, wherein the silicon-based electrode is selected from the group consisting of polycrystalline silicon (p-Si), amorphous silicon (a-Si) and single crystal silicon.

43. The EL device of claim 39, wherein said silicon-based electrode comprises a dopant to impart conductivity.

44. The EL device of claim 43, wherein said dopant is selected from the group consisting of B, P, As, Sb and Al in an amount of about 0.001 to 5 at. %.

45. The EL device of claim 34, wherein said light emitting layer comprises a phosphor.

46. The EL device of claim 45, wherein said phosphor is a sulfide phosphor.

47. The EL device of claim 46, wherein said sulfide phosphor is a ZnS phosphor.

* * * * *